June 2, 1931.                H. J. BURNISH                1,807,961
                    METHOD OF ELECTRIC ARC WELDING
                         Filed Nov. 29, 1929
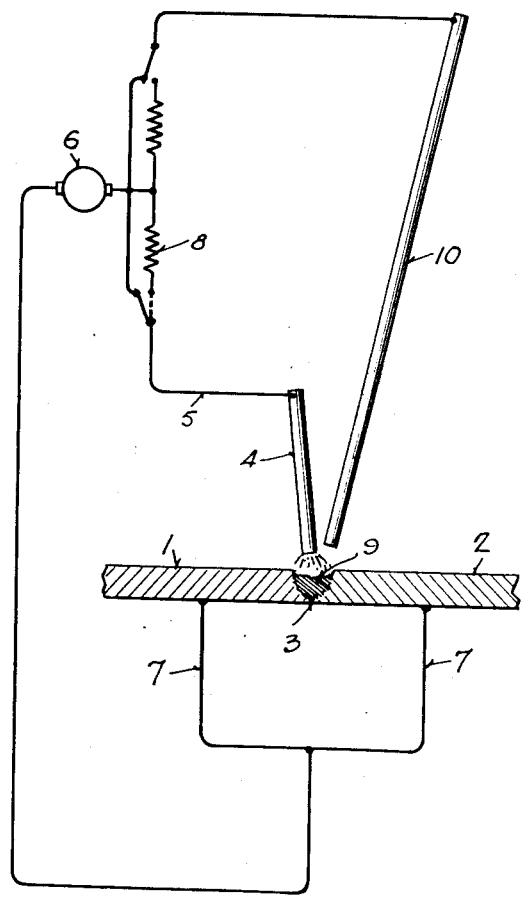
INVENTOR.
Howard J. Burnish
BY
ATTORNEY.

Patented June 2, 1931

1,807,961

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRIC ARC WELDING

Application filed November 29, 1929. Serial No. 410,478.

This invention relates to a method of electric arc welding and particularly to arc welding wherein a fusible metallic weldrod of definite length is employed and the seam to be welded is of dimensions requiring employment of more than one weldrod to complete the weld.

The object of the invention is to provide a method of electric arc welding wherein the change from one weldrod to another is made without interruption of the welding arc.

Another object is to provide a more uniformly welded seam.

The invention is diagrammatically illustrated in the accompanying drawings.

The parts 1 and 2 to be welded are arranged with their opposed edges forming a seam 3.

A fusible metallic weldrod 4 is connected by lead 5 to one pole of a welding generator 6 while the parts 1 and 2 are connected by leads 7 to the other pole of the generator 6. A resistance 8 is adapted to be connected in series in the lead 5.

In carrying out the welding operation one end of the weldrod 4 is brought into contact with the parts 1 and 2 to establish a flow of welding current and then withdrawn to establish an arc between the weldrod and the parts being welded. Other means of establishing the arc may be employed.

As the weldrod metal reaches a fusing temperature it is projected through the arc onto the edges of the parts being welded and is fused with said edges to weld the same together.

The weldrod is moved along the edges to deposit the welding metal 9 therealong and thereby unite the parts 1 and 2 into an integral structure.

As the weldrod 4 is fused away by the welding arc it becomes shorter and prior to the completion of the welding operation the weldrod becomes too short for practical use and it becomes necessary to finish the weld by employing one or several more weldrods.

As illustrated, a second weldrod 10 is connected to the same pole of generator 6 as the weldrod 4 is connected to. The end of the weldrod 10 is then brought into position adjacent the arcing end of weldrod 4 and the resistance 8 is connected in the lead 5 thus making a difference in potential between the two weldrods, the weldrod 10 having the higher potential. This causes the arc to be transferred to the weldrod 10 and the weldrod stub 4 is then withdrawn. The welding operation is is then continued with weldrod 10 until the weld is completed or until the weldrod is substantially fused away, in which latter case another weldrod is substituted for weldrod 10 in much the same manner as weldrod 10 was substituted for weldrod 4.

In employing the invention it has been found preferable to use bare metallic weldrods. However, weldrods which are covered with suitable fluxes or arc protecting materials may be employed. Where covered weldrods are employed it is sometimes preferable to have the starting end of the weldrod bare and free from the covering so that it will more readily receive the arc from the weldrod which is to be withdrawn.

The invention may be carried out either by hand or by machine operation and eliminates the necessity of striking the arc for each weldrod employed. The heat of the arc brings the end of the new weldrod 10 to fusing temperature prior to the withdrawal of the old weldrod or stub 4. In this manner the welding operation is continuous and uninterrupted and the disadvantages of starting a new arc with cold weldrod metal during the welding operation are overcome. The welding metal 9 which is deposited by this method is more uniform and is free from the crater ordinarily formed where the arc is interrupted to replace weldrods.

I claim:

1. The method of electric arc welding which comprises establishing an electric welding arc between one end of a fusible metallic weldrod and the work to be welded, maintaining said welding arc until the metal of said weldrod is substantially fused away and deposited upon the work, inserting the end of another similar weldrod into said welding arc and adjacent the end of said first named weldrod, said weldrods being connected to the same source of electrical energy, inserting a resistance in the circuit of said first named weldrod to decrease the potential of the electric circuit thereof across the arc whereby the arc is transferred without interruption to said second named electrode, withdrawing the first named electrode, and continuing the welding operation with said second named weldrod.

2. The method of transferring a welding arc without interruption from one welding electrode to another welding electrode during the welding operation which comprises, connecting the second named electrode to a source of current of potential equal to that of the first named electrode placing the bare starting end of the second named electrode adjacent the arcing end of the first named electrode, preheating the starting end of the second named electrode in the heat of the arc of the first named electrode, decreasing the electrical potential of the first named electrode to cause the arc to transfer without interruption from the first named to the second named electrode, removing the first named electrode and continuing the welding operation with the second named electrode.

In witness whereof I have signed my name at Milwaukee, Wisconsin, this 26th day of November, 1929.

HOWARD J. BURNISH.